US006722045B2

(12) United States Patent
Mang

(10) Patent No.: US 6,722,045 B2
(45) Date of Patent: Apr. 20, 2004

(54) GUIDE BAR HAVING ROTATING GUIDE DISCS

(75) Inventor: Harald Mang, Winnenden (DE)

(73) Assignee: Andreas Stihl AG & Co., Waiblingen (DE)

( * ) Notice: Subject to any disclaimer, the term of this patent is extended or adjusted under 35 U.S.C. 154(b) by 48 days.

(21) Appl. No.: 10/075,457

(22) Filed: Feb. 15, 2002

(65) Prior Publication Data

US 2002/0112355 A1 Aug. 22, 2002

(30) Foreign Application Priority Data

Feb. 16, 2001 (DE) ........................................ 101 07 303

(51) Int. Cl.$^{7}$ .......................... B23D 57/02; B27B 17/02

(52) U.S. Cl. ......................................................... 30/384

(58) Field of Search .......................... 30/384, 385, 383; 125/21

(56) References Cited

U.S. PATENT DOCUMENTS 4,593,591 A * 6/1986 Beerens .................... 30/384 X

* cited by examiner

*Primary Examiner*—Douglas D. Watts
(74) *Attorney, Agent, or Firm*—Walter Ottesen

(57) ABSTRACT

The invention is directed to a guide bar for a motor-driven chain saw (1) and includes a longitudinally extending flat base body (2) having a peripherally extending guide groove (3) for guiding a saw chain (4). In the region of the direction-changing section (12) of the guide bar (13), the saw chain (4) is partially laterally covered by guide discs (14, 14'), which rotate along with the idler sprocket (16). The guide discs (14, 14') include radially projecting sections (18) whose number is identical with the number of the teeth (17) of the idler sprocket (16). The tendency to kickback of the motor-driven chain saw is reduced with these constructive measures.

13 Claims, 5 Drawing Sheets

GUIDE BAR HAVING ROTATING GUIDE DISCS

BACKGROUND OF THE INVENTION

A known guide bar includes guide plates in the region of its tip on each longitudinal side thereof. The guide plates project laterally beyond the guide paths of the guide groove. The radial projection is provided in such a manner that the chain links are laterally substantially covered and only the cutting links extend beyond the edge of the guide plates. In this way, it is ensured that for plunge cutting, the depth of penetration of the cutting teeth into the wood to be cut is reduced. Difficulties with respect to the manipulation during plunge cutting work are intended to be reduced thereby.

A too large a projection of the side walls, however, negatively affects the cutting power and plunge cutting work during tree maintenance is thereby hampered. On the other hand, if the projection of the side walls, especially in the direction-changing region of the guide bar, is too low, then the manipulation of the motor-driven chain saw is made more difficult.

SUMMARY OF THE INVENTION

It is an object of the invention to provide a guide bar wherein the guidance of the saw chain is improved while retaining good cutting power during plunge cutting work and to provide a guide bar which can be used for saw chains of different configurations.

The guide bar of the invention is for guiding the saw chain of a motor-driven chain saw. The saw chain includes center drive links, cutting links and connecting links pivotally interconnected with bolts or rivets. The drive links include respective rakers and the guide bar includes: an elongated flat base body having mutually adjacent guide surfaces along the periphery thereof for supporting said connecting links and said cutting links as the saw chain is moved about said guide bar during the operation of the chain saw; said mutually adjacent guide surfaces being separated by a guide groove for receiving said rakers therein; said base body having a front end; a direction-changing front end assembly arranged on said front end of said base body for said saw chain; and, said front end assembly including: a rotatably mounted idler sprocket for engaging and guiding said saw chain about the front end of said guide bar; guide discs attached to said idler sprocket at respective sides thereof so as to rotate therewith; said guide discs having a number of radially projecting sections; and, said idler sprocket having a number of teeth equal to the number of sections of each of said guide discs.

The idler sprocket is held in the direction-changing section of the guide bar and the guide plates are configured as rotating discs in the direction-changing section. The rotating discs are connected to the idler sprocket so as to rotate therewith. With this configuration, the advantages of a reliable guidance of the motor-driven chain saw with the aid of guide plates on the guide bar are combined with a good cutting power. In lieu of circularly-shaped edges in the region of each tooth of the idler sprocket, the guide discs have radially projecting sections. These sections can have a rectangular shape, a rhombic shape or a trapezoidal shape.

The dimensioning of the guide discs is adapted to the dimensions of the guide bar and the idler sprocket so that the width of the gaps or cutouts between the radially projecting sections of the guide discs in the peripheral direction of the guide discs is approximately as large as the length of the roof sections of the cutting links. The cutting links include a side or lateral cutting edge which has a contour laterally offset outwardly referred to the running direction of the saw chain and projects beyond the side surfaces of the guide disc in the region of the cutout. The radial outer edge of the guide discs ends at a slight distance just below the roof cutting edge so that the tip of the cutting roof section of the cutting tooth of a cutting link projects beyond the axial edge of the guide disc. The cutouts between the radially projecting sections of the guide disc are preferably longer than the width of the radially projecting sections in the peripheral direction.

The edges of the radially projecting sections which extend in the radial direction of the guide discs can be configured as cutting edges in order to support the lateral cutting work. Preferably, the edges run in a radial direction inclined in opposition to the rotational direction of the guide discs. Each radially projecting section and each roof section follow one behind the other in this way during operation of the motor-driven chain saw. The depth limiter of a cutting link advantageously comes to rest in the region of the leading edge of a radially projecting section viewed in the rotating direction of the guide discs. At the direction-changing section, the idler sprocket is surrounded at both sides by side plates which axially guide the idler sprocket and project radially therebeyond. Respective bearings for rotatively journaling the idler sprocket and the disc are provided in the side plates. The guide discs are preferably connected to the idler sprocket so as to rotate therewith and are driven by the moving saw chain. The guide discs are exchangeably mounted at the direction-changing section of the guide bar and can be exchanged with the saw chain. It can be practical to so configure the guide bar that the guide discs can be turned over in that the guide discs are essentially configured to be axial symmetrical with respect to their basic outline. Preferably, the guide discs are provided with a largest possible number of radially projecting sections.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
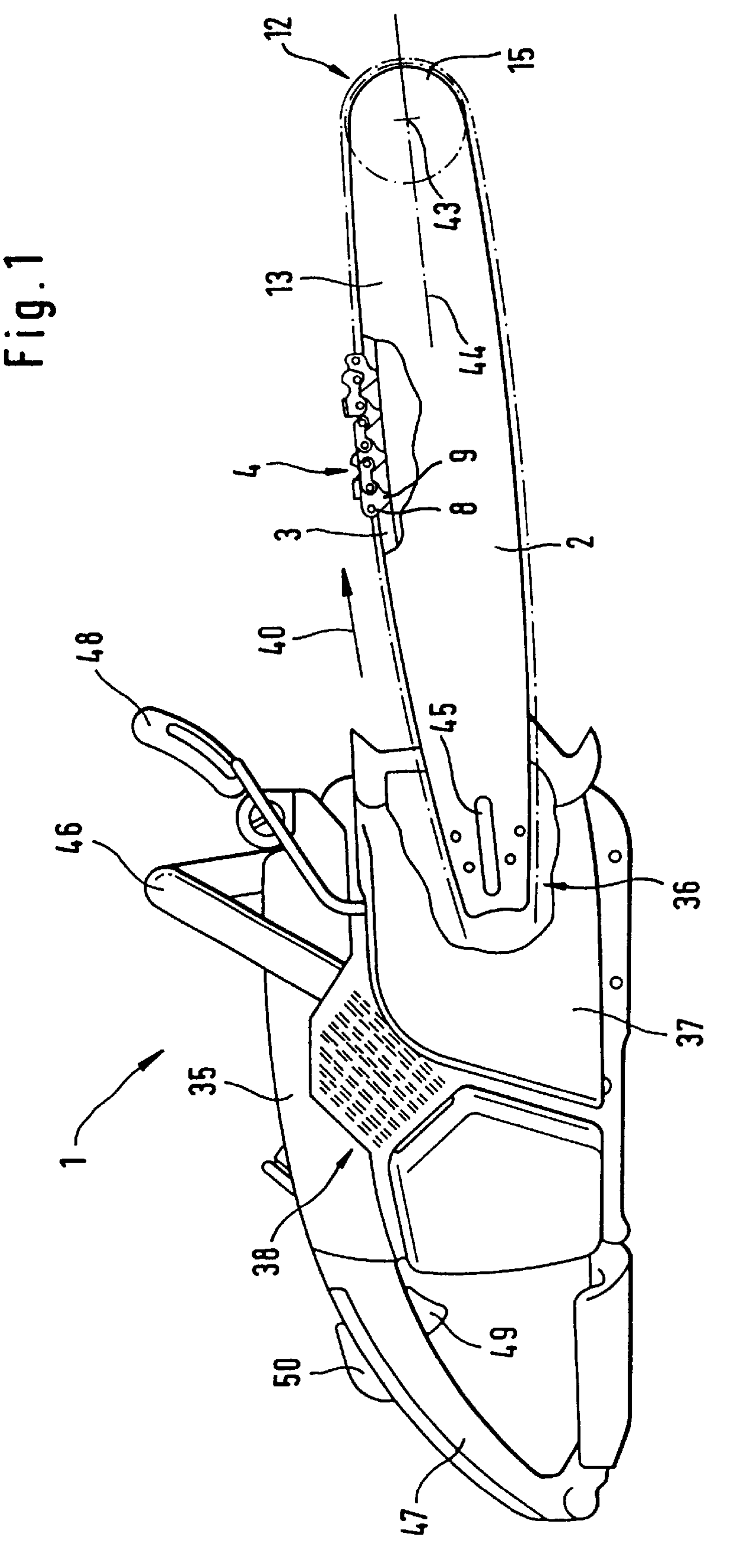
FIG. 1 is a schematic view of a motor-driven chain saw incorporating the guide bar of the invention.

FIG. 1 shows a schematic representation of the motor-driven chain saw 1 having a housing 35 on which a guide bar 13 is fixed for a saw chain 4 which moves along the periphery thereof. The guide bar 13 is clamped at its attachment end 36 between a sprocket wheel cover 37 and the housing 35 and is essentially formed from an elongated flat base body 2.

Figure 3:
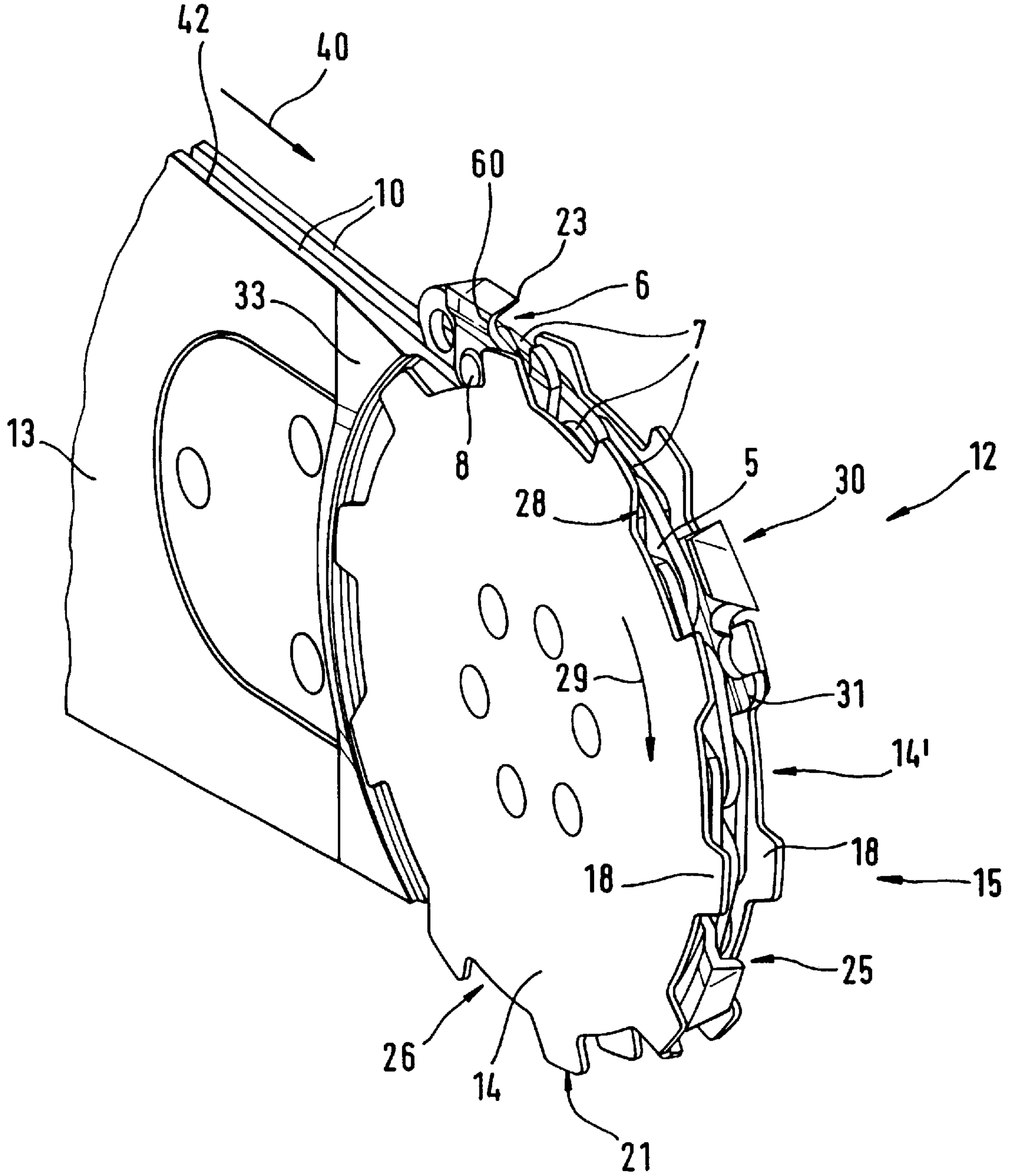
FIG. 3 is a perspective view of the front end of the guide bar in accordance with a further embodiment of the invention.
Figure 4:
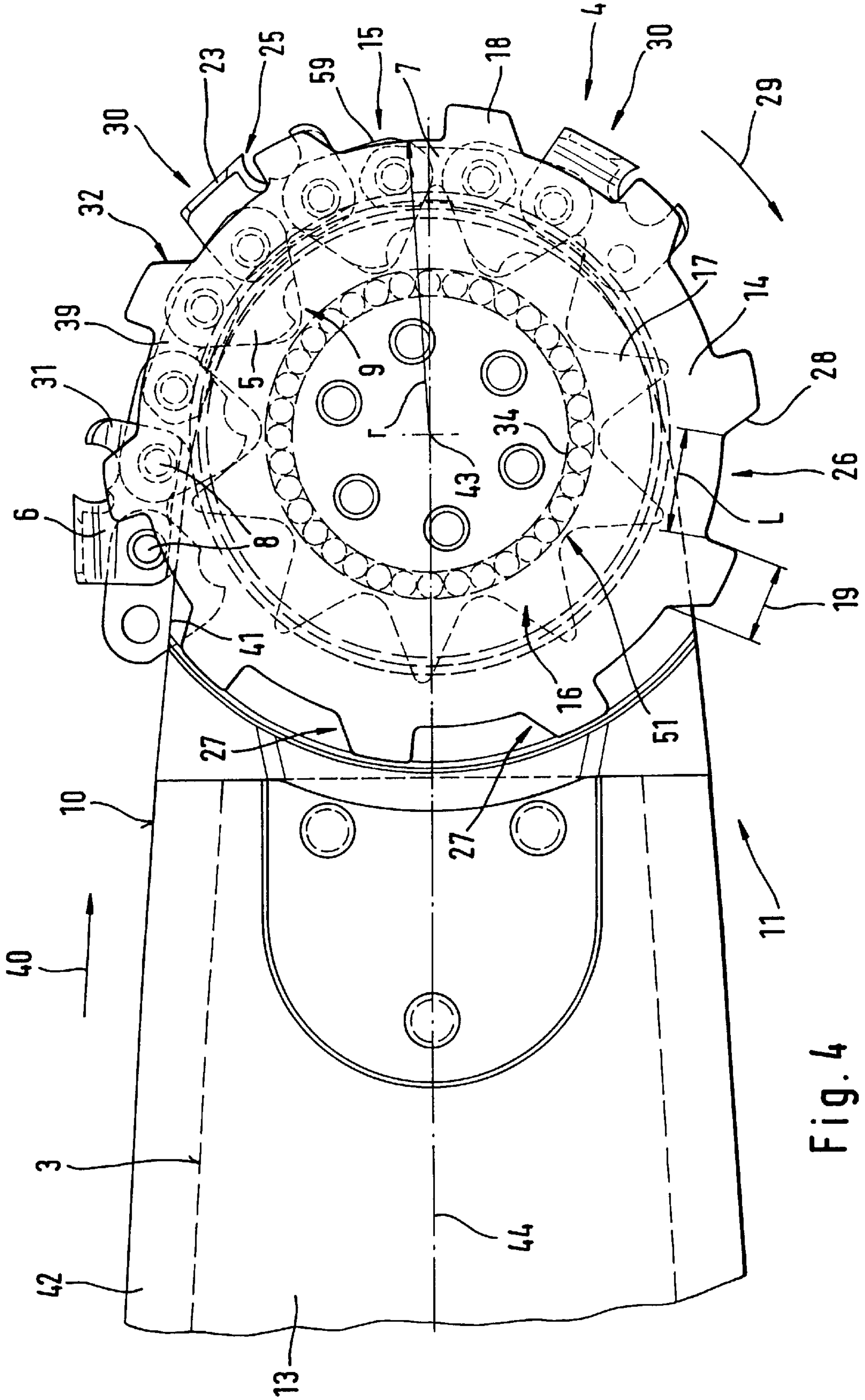
FIG. 4 is a side elevation view of the front end portion of the guide bar shown in FIG. 3; and, FIG. 5 is an exploded view of the front end portion shown in FIG. 3.
Figure 5:
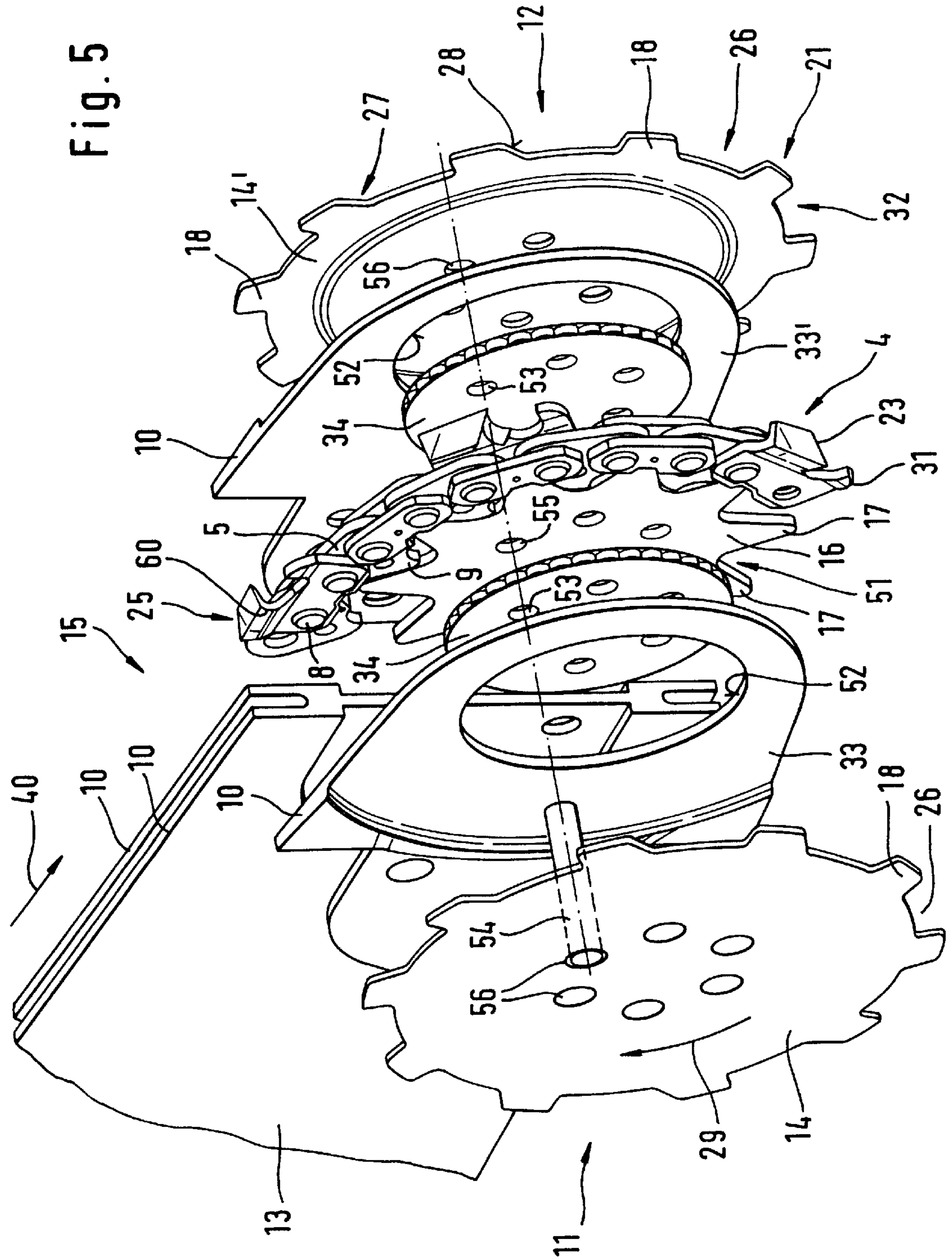

The saw chain 4 is driven by a drive motor 38 mounted in the housing 35 of the motor-driven chain saw. The drive motor is an internal combustion engine having a stroke piston or a rotating piston and is operated in accordance with the two-stroke method or the four-stroke method. As shown in FIGS. 3, 4 and 5, the saw chain 4 comprises connecting links 7, which are configured as simple side links 39 and cutting links 6. Each cutting link includes a side cutting edge 60 which is offset laterally outwardly referred to the running direction of the saw chain. Each cutting link further includes a roof section 30 angled off to the center drive link 5. A roof cutting edge 23 is formed on the roof section 30. Viewed in the running direction 40, a depth limiter 31 is provided on the cutting link 6 forward of the roof cutting edge 23. A guide groove 3 is provided in the outer periphery of the guide bar 13 and rakers 9 of the center drive links 5 engage in this guide groove. The center drive links 5 as well as the side connecting links 7 are pivotally interconnected with the aid of bolts 8 or rivets. The cutting links 6 are arranged alternately on the right and left longitudinal sides of the saw chain 4.

The connecting links 7 glide with their foot sections 41 on the guide surfaces 10. The guide surfaces 10 are arranged on both longitudinal sides of the guide groove 3 on the outer periphery 42 of the guide bar 13. At the direction-changing section 12 of the guide bar tip 15, lateral guide plates 11 in the form of rotating guide discs (14, 14') are provided. The rotational axis 43 of the guide discs (14, 14') lies on the longitudinal center axis 44 of the guide bar 13. The guide discs (14, 14') are connected to the idler sprocket 16 so as to rotate therewith and are rotationally entrained by the running saw chain 4.

As shown in FIG. 1, the attachment end 36 of the guide bar 13 includes a longitudinal slit 45 lying on the longitudinal center axis 44 through which stud bolts pass when attaching the guide bar 13 to the housing 35. The stud bolts are fixed in the chain saw housing 35. The motor-driven chain saw 1 is guided and held with a forward handle 46 as well as with a rearward handle 47. The forward handle 46 extends over the housing 35 and the rearward handle 47 lies aligned in the direction of the longitudinal center axis 44. A guard lever 48 is assigned to the forward handle 46 to protect the operator. A safety brake device is activated via the guard lever 48 and brings the saw chain 4 to standstill in fractions of a second in order to minimize the danger of injury to the operator. The saw chain 4 runs in the arrow direction 40. In the rearward handle 47 (in the grip range of the hand of the operator), a throttle lever 49 is provided and a throttle lever latch 50 is assigned thereto.

As shown in FIGS. 3 and 5, the direction-changing section 12 is formed from two side plates (33, 33'). The idler sprocket 16 is arranged between the side plates and is configured similarly to a gear wheel. The rakers 9 of the center drive links 5 engage in the gaps 51 between two teeth 17 of the idler sprocket 16. The outer edge of the side plates (33, 33') forms the guiding surface 10 in the direction-changing section 12. The side plates (33, 33') are attached to the base body 2 of the guide bar 13 and include a bearing 34 as shown in FIG. 5. Each bearing is held in a corresponding bearing receptacle 52 of the side plates 33.

In the embodiment shown, the guide discs (14, 14') are configured identical to each other and are arranged on the outside surfaces of the side plates (33, 33') which face away from the idler sprocket 16. A receptacle 52 for the bearing 34 is open to the guide discs (14, 14'). Each bearing 34 has openings 53 for receiving rivet bolts or the like. As shown schematically in FIG. 5, a rivet bolt 54 of this kind engages through an opening 56 of the guide disc 14, through an opening 53 of the bearing 34 in the side plate 33, an opening 55 in the idler sprocket 16 as well as a next opening 53 in the bearing 34 of the side plate 33'. The rivet bolt 54 projects beyond the bearing and engages through an assigned opening 56 in the guide disc 14' so that the guide discs (14, 14') are connected to the idler sprocket 16 so as to rotate therewith. The idler sprocket 16 takes up the raker 9 of a drive link 5 in each gap and the guide discs (14, 14') are connected in predetermined positions to the idler sprocket 16. For this reason, a relative movement between the saw chain 4 and the guide discs (14, 14') is reliably avoided.

The guide discs (14, 14') have ten radially projecting sections 18. The number of teeth 17 of the idler sprocket 16 is therefore equal to the number of the radially projecting sections 18 of a guide disc (14, 14'). The radially projecting sections 18 are distributed uniformly over the periphery of a guide disc (14, 14'). The guide discs (14, 14') lie on the outer surfaces of the side plates (33, 33') and extend radially beyond the guide surfaces 10 and partially laterally cover the saw chain 4.

Figure 2:
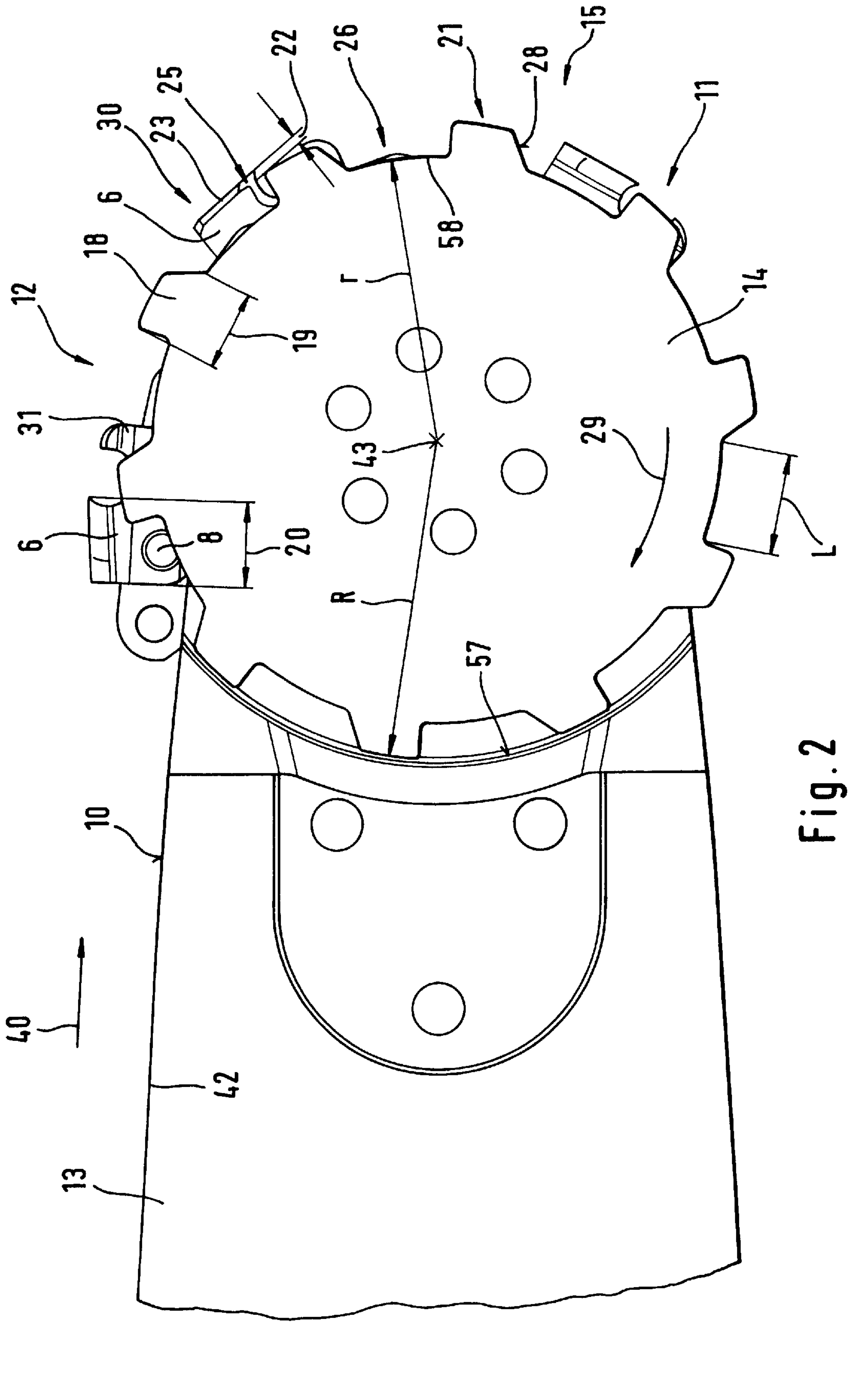
FIG. 2 is a side elevation view of the front end of the guide bar according to the invention.

As shown in FIGS. 3 and 5, the side cutting edge 60 projects through the gap or cutout 26 of the guide discs (14, 14') because of its form and extends beyond the outer sides thereof so that the cutting width is somewhat greater than the thickness of the guide bar in the region of the guide discs (14, 14'). The width L (see FIG. 4) of the cutouts 26, when viewed in the peripheral direction of the guide discs (14, 14'), is approximately as large as the length 20 of the cutting roof sections 23 of the cutting links 6. The maximum radius R of the guide discs (14, 14') is so selected that each edge 21 thereof ends at only a slight distance 22 radially below the circular path of the cutting edge of the cutting roof section 23 (see FIGS. 2 and 4). In the region of the cutting links 6, the cutout 26 is provided on the disc periphery and exposes the cutting teeth 25. The base edge 58 of the cutout 26 lies with a radius (r) approximately at the elevation of the upper edge 59 of the drive link 5 or the lateral offset of the cutting link 6. The upper edge 59 faces toward the roof cutting edge 23 of the cutting link 6. The position of the base edge 58 of the cutout 26 laterally of the saw chain 4 can be seen especially in FIGS. 2 and 4.

As shown in FIG. 3, the side cutting edge 60 of the cutting tooth 25 projects laterally beyond the edge 21 of the guide discs (14, 14') so that the lateral cut is made primarily by the cutting tooth. Each cutout 26 (see FIG. 4) extends in the peripheral direction over the length L which is preferably greater than the width 19 of the radially projecting section 18.

It can be advantageous to configure the radial edge 27 of each radially projecting section 18 as a cutter 28 as shown in FIGS. 3 and 5. Preferably, the two edges 27 are configured as cutters 28 whereby the guide discs (14, 14') can be configured to be identical. The guide discs (14, 14') are arranged on the right and left sides at the tip 15 of the guide bar. The cutters 28 of the guide discs (14, 14') can advantageously influence the removal power of the saw chain in plunge or thrust cutting operations.

If plunge cutting into wood occurs with the guide bar configured in accordance with the invention as, for example, is necessary with tree maintenance work, then the roof sections 30 project into the space between each two sequential radial projection sections 18 whereby too deep a penetration of the roof cutting edges 23 into the wood is reliably avoided. The roof sections 30 remain between the two sections 18. The depth limiter 31 of the cutting links 6 is at the region of the leading edge 32 of a radially projecting section 18 so that a radially projecting section 18 with a cutting link 6 forms a saw tool.

It is understood that the foregoing description is that of the preferred embodiments of the invention and that various changes and modifications may be made thereto without departing from the spirit and scope of the invention as defined in the appended claims.

What is claimed is:

1. A guide bar for guiding the saw chain of a motor-driven chain saw, the saw chain including center drive links, cutting links and connecting links pivotally interconnected with bolts or rivets, the drive links including respective rakers, the guide bar comprising:

an elongated flat base body having mutually adjacent guide surfaces along the periphery thereof for supporting said connecting links and said cutting links as the saw chain is moved about said guide bar during the operation of the chain saw;

said mutually adjacent guide surfaces being separated by a guide groove for receiving said rakers therein;

said base body having a front end;

a direction-changing front end assembly arranged on said front end of said base body for said saw chain; and, said front end assembly including: a rotatably mounted idler sprocket for engaging and guiding said saw chain about the front end of said guide bar; guide discs attached to said idler sprocket at respective sides thereof so as to rotate therewith; said guide discs extending radially beyond said guide surfaces and laterally covering said connecting links; said guide discs having a number of radially projecting sections; and, said idler sprocket having a number of teeth equal to the number of sections of each of said guide discs.

2. A guide bar for guiding the saw chain of a motor-driven chain saw, the saw chain including center drive links, cutting links and connecting links pivotally interconnected with bolts or rivets, the drive links including respective rakers, the guide bar comprising:

an elongated flat base body having mutually adjacent guide surfaces along the periphery thereof for supporting said connecting links and said cutting links as the saw chain is moved about said guide bar during the operation of the chain saw;

said mutually adjacent guide surfaces being separated by a guide groove for receiving said rakers therein;

said base body having a front end;

a direction-changing front end assembly arranged on said front end of said base body for said saw chain;

said front end assembly including: a rotatably mounted idler sprocket for engaging and guiding said saw chain about the front end of said guide bar; guide discs attached to said idler sprocket at respective sides thereof so as to rotate therewith; said guide discs having a number of radially projecting sections; and, said idler sprocket having a number of teeth equal to the number of sections of each of said guide discs;

each of said cutting links having a cutting roof;

each two mutually adjacent ones of said sections conjointly defining a gap therebetween having a length (L) measured in the peripheral direction of said guide disc; and, said length (L) of said gap corresponding approximately to the length of the cutting roof of said cutting link.

3. The guide bar of claim 2, wherein each of said sections has an outer edge which radially ends a small distance below the cutting edge of the cutting link.

4. The guide bar of claim 2, wherein each of said guide discs has an outer surface; and, each of said cutting teeth has a side cutting edge which projects laterally through a corresponding one of said gaps so as to extend beyond the outer surface of the guide disc.

5. The guide bar of claim 2, wherein each of said sections has a peripheral width measured in the peripheral direction of the disc corresponding thereto; and, the length (L) of each of said gaps is longer than the peripheral width of each one of said sections.

6. The guide bar of claim 2, wherein each of said sections has a leading edge falling back from a radius drawn from the center of rotation of said idler sprocket viewed in the direction of rotation; and, said leading edge is formed as a cutting edge.

7. The guide bar of claim 6, wherein the cutting roof of each of the cutting links comes to rest in a corresponding one of said gaps of the corresponding one of said guide discs.

8. The guide bar of claim 6, wherein each of said cutting links has a depth limiter which comes to rest in the region of the leading edge of a corresponding one of said sections.

9. The guide bar of claim 8, wherein said front end assembly includes side plates attached to said base body and said side plates include a bearing arranged therein for rotatably journaling a corresponding one of said guide discs.

10. The guide bar of claim 9, wherein said guide discs are rotatably driven by the moving saw chain.

11. The guide bar of claim 10, wherein said guide bar is symmetrical so that it can be turned.

12. The guide bar of claim 11, wherein the cutting links engage corresponding ones of said gaps as the saw chain is moved around the guide bar.

13. The guide bar of claim 2, wherein said guide discs extend radially beyond said guide surfaces and laterally cover said connecting links.

* * * * *